US 6,594,760 B1

(12) United States Patent
Ryan, Jr. et al.

(10) Patent No.: US 6,594,760 B1
(45) Date of Patent: Jul. 15, 2003

(54) SYSTEM AND METHOD FOR SUPPRESSING CONDUCTED EMISSIONS BY A CRYPTOGRAPHIC DEVICE

(75) Inventors: Frederick W. Ryan, Jr., Oxford, CT (US); Monroe A. Weiant, Jr., Trumbull, CT (US); Edward J. Twarog, Norwalk, CT (US)

(73) Assignee: Pitney Bowes Inc., Stamford, CT (US)

( * ) Notice: Subject to any disclaimer, the term of this patent is extended or adjusted under 35 U.S.C. 154(b) by 0 days.

(21) Appl. No.: 09/217,977

(22) Filed: Dec. 21, 1998

(51) Int. Cl.$^7$ .............................. G06F 12/14
(52) U.S. Cl. .......................... 713/189; 380/1
(58) Field of Search ............... 380/52, 1; 713/189, 713/193, 194, 200; 705/405, 410

(56) References Cited

U.S. PATENT DOCUMENTS

| 4,932,053 A | | 6/1990 | Fruhauf et al. ............. 380/4 |
| 5,533,123 A | * | 7/1996 | Force et al. ............. 713/189 |
| 5,995,629 A | | 11/1999 | Reiner et al. ............. 380/50 |

FOREIGN PATENT DOCUMENTS

| EP | 0268882 | | 11/1987 |
| EP | 0463261 | A1 | 12/1990 |
| FR | 2793904 | | 5/1999 |
| WO | WO 98/20461 | | 5/1998 |
| WO | WO 99/63423 | | 12/1999 |
| WO | WO 00/26868 | | 5/2000 |
| WO | WO 00/54230 | | 9/2000 |

* cited by examiner

Primary Examiner—Matthew Smithers
(74) Attorney, Agent, or Firm—Brian A. Lemm; Angelo N. Chaclas; Charles R. Malandra, Jr.

(57) ABSTRACT

System and method for performing cryptographic operations include providing at least one processor for performing cryptographic operations, memory coupled to the processor for use in performing the cryptographic operations; and a storage component coupled to the processor for storing and retrieving information calculated and used in the cryptographic operations. The processor, memory and storage component are securely enclosed whereby direct access to the cryptographic operations is prevented. A first power source, which is external to the secure enclosure, is coupled to and supplies power to the processor, the memory and the storage component. A second power source, which is internal to the secure enclosure, is coupled to and supplies power to at least the processor. A switch is included for switching from the first power source to the second power source when the cryptographic operations are being performed and for switching from the second power source to the first power source when non-cryptographic operations are being performed.

12 Claims, 4 Drawing Sheets

US 6,594,760 B1

SYSTEM AND METHOD FOR SUPPRESSING CONDUCTED EMISSIONS BY A CRYPTOGRAPHIC DEVICE

FIELD OF THE INVENTION

The present invention relates generally to postage metering systems and methods and, more particularly, to closed and open postage metering systems and methods employing cryptographic processes for evidencing postage payment.

BACKGROUND OF THE INVENTION

The vast majority of the Posts around the world require prepayment for postal services provided by the Posts. This allows the Posts to avoid the substantial time and cost associated with a post-payment system that requires processing billing data and collecting and processing remittance. Prepayment, however, necessitates that individual mailpieces carry verifiable evidence of paid postage. The traditional postage stamp is a prime example of such evidence. Although postage stamps are good for many applications by low volume mailers, for moderate to high volume mailers the application of stamps is difficult and costly and are subject to theft. Furthermore, stamps do not provide information such as date and place of mailing and provide limited postal revenue security.

Arthur Pitney invented the first postage meter in 1902 to alleviate some shortcomings of postage stamps. This postage meter was a mechanical device with securely coupled printing and accounting functions. The mechanical meter, which was perfected over the years, became a widespread basic business machine. With the advent of the microprocessor, the accounting and machine control functions were computerized when electronic postage meters were introduced in the late seventies. This enabled new features, including departmental accounting and computerized meter resetting. However, the fundamental security of postage evidencing remained the same.

Postal revenue security in the analog postage meters, such as the mechanical and electronic postage meters, depends on two features: 1) physical security of the printing process, i.e., printing of postage evidence can not occur without appropriate accounting, and 2) forensic detectability, i.e., fraudulent postal indicia can be distinguished from legitimate indicia.

Coupling the printing and accounting mechanism within a secure tamper evident enclosure provides physical security of printing. Inspection of the device normally reveals tampering. Effective forensic detectability of fraudulent postal indicia depends on non-availability of alternative mechanisms suitable for forging indicia. Before the proliferation of inexpensive, high print quality computer printers, serious attempts to generate fraudulent indicia using an alternate printing mechanism were detectable.

Today, the availability of inexpensive computer-driven printers provides opportunities for customer convenience and cost advantages for printing postage evidence. However, the use of such printers requires a new way of securing postage which was first suggested in U.S. Pat. Nos. 4,641, 347, 4,641,346, 4,757,537, and 4,775,246. At that time, it was realized that the security of postage evidencing depends on the security of the information printed in the indicium, including message authentication and integrity. U.S. Pat. Nos. 4,831,555 and 4,725,718 extended this idea to unsecured printing of postage disclosing the necessity that at least some of the information in the indicium must appear random to a party not in possession of some secret. Such random looking information is commonly referred to as a digital token.

The basis of postal revenue security in the digital world is two new requirements: 1) security of the digital token generating process, i.e., digital tokens can not be generated without appropriate accounting, and 2) automatic detectability, i.e., fraudulent digital tokens can be detected by automatic means.

A cryptographic transformation applied to selected data on the mailpiece produces the digital token. The data may include postage value, date, postal code of the geographical deposit area, recipient address information, meter data, and piece count. Such data is commonly referred to as postal data. The secret used to generate the digital token is generally a cryptographic key held within the accounting device. A verifier, with access to a verifying key corresponding to the accounting device secret, validates the digital token. Several cryptographic algorithms and protocols have been considered for this purpose. U.S. Pat. No. 4,853,961 describes critical aspects of public-key cryptography for mailing applications. See José Pastor, "CRYPTOPOST™ A Universal Information-Based Franking System for Automated Mail Processing", *Proceedings of the Fourth Advanced Technology Conference of the U.S. Postal Service*, Vol. I, pp. 429–442, November 1990. See also José Pastor, "CRYPTOPOST™ A Cryptographic Application to Mail Processing", *Journal of Cryptology*, 3 (2), pp. 137–146, November 1990.

Two methods of presenting a postal verifier with fraudulent evidence of payment are a counterfeited indicium and a copied indicium. The former is an unpaid indicium that appears legitimate. The latter is a replay of a legitimate paid indicium. The present invention addresses the prevention of counterfeit indicium.

A counterfeit indicium can be detected by verifying the digital token. Verification proves that the digital token was generated by a cryptographic algorithm with access to the secret meter key. The information printed in the indicium and access to a verifying key are sufficient for the detection of counterfeited indicia as long as the secret meter key is confidential. In a public-key system, a digital signature provides the data authentication and integrity check. In a symmetric-key system a message authentication code (MAC) provides a similar check. Detection of counterfeiting is an integrity check.

Assuming integrity of the verification software and hardware, only a compromised meter secret-key can produce counterfeit indicia that passes an integrity check. This compromise could happen by violating the physical protection of the key by tampering, or by deriving the key from indicia data by cryptanalysis. Generally, tampering is detectable if the physical protection of the secure component of the postage metering system is adequate, for example following FIPS 140-1, Security Requirements for Cryptographic Modules, National Institute for Standards and Technology, January 1994. Robustness against cryptanalysis depends on the difficulty of solving certain mathematical problems, for example, discrete logarithm problems or factoring a large composite number. As part of its proposed Information-Based Indicia Program (IBIP), the USPS has proposed 1024 bit RSA or 1024 bit DSS as a measure of robustness, The IBIP is a distributed trusted system that is expected to support new methods of applying postage in addition to, and eventually in lieu of, the current approach, which typically relies on a postage meter to mechanically print indicia on mailpieces. The IBIP requires printing large, high density, two dimensional (2D) bar codes on mailpieces. The Postal Service expects the IBIP to provide cost-effective assurance of postage payment for each mailpiece processed.

The USPS has published draft specifications for the IBIP. The INFORMATION BASED INDICIA PROGRAM (IBIP) INDICIUM SPECIFICATION, dated Jun. 13, 1996, defines the proposed requirements for a new indicium that will be applied to mail being processed using the IBIP. The INFORMATION BASED INDICIA PROGRAM POSTAL SECURITY DEVICE SPECIFICATION, dated Jun. 13, 1996, defines the proposed requirements for a Postal Security Device (PSD) that will provide security services to support the creation of a new "information based" postage postmark or indicium that will be applied to mail being processed using the IBIP. The INFORMATION BASED INDICIA PROGRAM HOST SYSTEM SPECIFICATION, dated Oct. 9, 1996, defines the proposed requirements for a host system element of the IBIP. The specifications are collectively referred to herein as the "IBIP Specifications". The IBIP includes interfacing user (customer), postal and vendor infrastructures which are the system elements of the program.

There are three information security objectives critical for postage evidencing: authentication, wherein a Post can read a payment message printed on a mailpiece and identify the postage accounting device responsible for the message; data Integrity, wherein the Post can detect any alteration of the payment message; and evidence of fraud, wherein the Post can detect evidence of fraud, such as a mailpiece with a counterfeited indicium or mailpieces with identical indicia.

In order to achieve authentication, the payment message must include an unique postage accounting device identification number and a message identification number, for example, a serial piece count or ascending register. The integrity of the payment itself requires inclusion of the postage amount. These elements, collectively referred to as postal or security data, represent a minimal set. Depending on the verification strategy additional elements, including delivery address information, may be included. An indicium should, at a minimum, contain: 1) the security data, and 2) the digital token produced by a cryptographic transformation applied to the security data. Cryptographic authentication proves integrity of these elements.

Presently, there are two postage metering types: closed systems and open systems. In a closed system, the system functionality is solely dedicated to metering activity. Examples of closed system metering devices include conventional digital and analog (mechanical and electronic) postage meters wherein a dedicated printer is securely coupled to a metering or accounting function. In a closed system, since the printer is securely coupled and dedicated to the meter, printing evidence of postage cannot take place without accounting for the evidence of postage. In an open system, the printer is not dedicated to the metering activity, freeing system functionality for multiple and diverse uses in addition to the metering activity. Examples of open system metering devices include personal computer (PC) based devices with single/multi-tasking operating systems, multi-user applications and digital printers. An open system metering device is a postage evidencing device with a non-dedicated printer that is not securely coupled to a secure accounting module. Open system indicia printed by the non-dedicated printer are made secure by including addressee information in the encrypted evidence of postage printed on the mailpiece for subsequent verification.

Conventional closed system mechanical and electronic postage meters have heretofore secured the link between printing and accounting. The integrity of the physical meter box has been monitored by periodic inspections of the meters. Digital printing postage meters, which are closed system postage meters, typically include a digital printer coupled to a metering (accounting) device, which is referred to herein as a postal security device (PSD). Digital printing postage meters have removed the need for physical inspection by cryptographically securing the link between the accounting and printing mechanisms. In essence, new digital printing postage meters create a secure point to point communication link between the accounting unit and printhead. See, for example, U.S. Pat. No. 4,802,218, issued to Christopher B. Wright et al and now assigned to the assignee of the present invention. An example of a digital printing postage meter with secure printhead communication is the Personal Post Office manufactured by Pitney Bowes Inc. of Stamford, Connecticut. An example of a digital printing postage meter in a secure housing is the PostPerfect™ also manufactured by Pitney Bowes Inc. of Stamford, Conn.

A recently published technique of Differential Power Analysis (DPA) has seriously threatened the security of cryptographic devices. The technique involves observation and analysis of fluctuations on the power line of a cryptographic device to determine the cryptographic secrets, i.e., the crypto keys, used by the device.

The DPA attack allows one to extract secret protected information from a supposedly secure cryptographic device by measuring variations in power consumption over time, and then applying sophisticated analysis to this information. Any type of secure cryptographic device that obtains its operating power from an external source is potentially susceptible to the attack. Such devices include smart cards, PC (PCMCIA) cards and printed circuit boards, including devices that are housed within a protected enclosure.

The attack is based on the principle that as the cryptographic processor performs its cryptographic functions, such as encryption or signing; transistors comprising the processor switch on and off, which changes the amount of current drawn from the source supplying power to the processor. Assuming the attacker has some knowledge of the functions performed by the cryptographic processor, the attacker can correlate the current changes with data being processed and the crypto keys being used. The significance of the attack is as follows.

Secure information systems are based on an assumption that the secret information, i.e., the crypto keys, stored within a secure cryptographic device are protected against disclosure to any attacker. It is well known to use physical tamper-resistant or tamper-proof physical security to prevent such disclosure. With such physical security in effect, it has been assumed that an attacker could only obtain crypto keys either by trying all the possible crypto keys associated with the algorithm being used (symmetric algorithms) or by carrying out a complex mathematical search (asymmetric algorithms). For accepted cryptographic algorithms, this search is prohibitive, e.g. obtaining a 1024 bit RSA key requires $2^{30}$ years of 300 Mhz PC computing. However, the DPA attack makes this assumption false. If the cryptographic device is subject to DPA attack, then the crypto key can be obtained in a matter of days or weeks using DPA. Thus it is imperative that the security community at large find means either to defeat this attack or to at least greatly lengthen the time and expertise needed to successfully carry it out.

Many of the proposed countermeasures to the DPA attack involve the introduction of signal noise or filters on the power line, random timing and delays during cryptographic processing, and the introduction of extraneous operations. These countermeasures make the attack much more difficult. However, an attacker can overcome them by obtaining more samples of power line fluctuations and applying more sophisticated analytical techniques.

SUMMARY OF THE INVENTION

It has been found that the present invention provides enhanced security and resistance to DPA attacks. The present invention provides a high level of resistance against the DPA attack by effectively disconnecting the source power line from the cryptographic device while critical operations are performed. As a result, the power fluctuations caused by individual operations can not be observed by monitoring the power line of the device.

In accordance with the present invention, a charge obtained from the source power line is stored in a power storage device, such as a battery or capacitor when cryptographic operations are not being performed. During cryptographic operations, power for the cryptographic processing is drawn from the storage device, effectively disconnecting the cryptographic processor from the power input. As a result, fluctuations on the power input cannot be correlated with individual cryptographic operations within the cryptographic device and a DPA attack cannot be performed on the device.

DESCRIPTION OF THE DRAWINGS

The above and other objects and advantages of the present invention will be apparent upon consideration of the following detailed description, taken in conjunction with accompanying drawings, in which like reference characters refer to like parts throughout, and in which.

DETAILED DESCRIPTION OF THE PRESENT INVENTION

Figure 1:
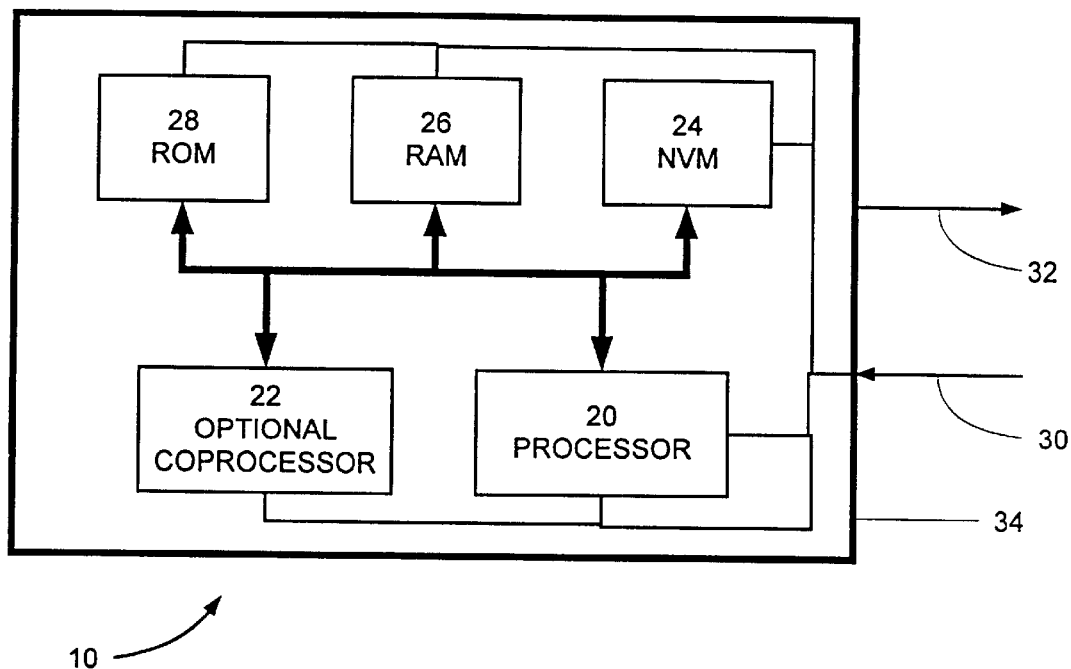
FIG. 1 is a block diagram of a traditional cryptographic device (prior art)

Referring now to FIG. 1, a block diagram of a traditional cryptographic device, generally designated 10, is shown. Cryptographic device 10 includes a conventional processor 20, coupled to an optional coprocessor 22, non-volatile memory 24, random access memory 26 and read-only memory 28. Cryptographic device 10 is enclosed within a secure housing 34. The secure housing 34 may be any conventional means for preventing access to cryptographic device 10. For example, secure housing 24 may be a integrated circuit chip encased in an epoxy that prevents access to the integrated circuit without destruction of the integrated circuit. Power to cryptographic device 10 is input at power line 30. Input/output communications occur at I/O line 32. It will be understood that cryptographic device 10 may be implemented as any number of discrete components or as a single integrated circuit, such as a smart card.

Figure 2:
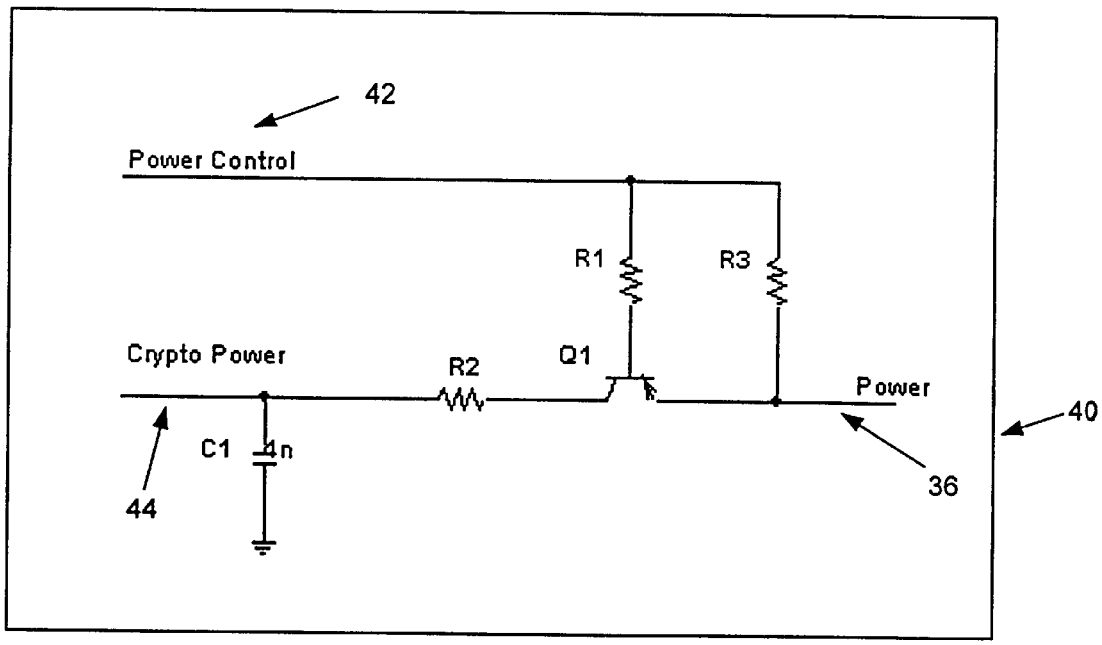
FIG. 2 is a temporary power storage circuit for use with the device of FIG. 1 in accordance with the present invention.

Referring now to FIG. 2, a power storage circuit, generally designated 40, is shown that can be used with cryptographic device 10 in accordance with the present invention. Power storage circuit 40, which is connected to power line 30 at line 36, includes a capacitor C1, a transistor Q1, and three resistors R1, R2 and R3. By placing power storage circuit 40 between the external power input line 30 and crypto coprocessor 22, the processor 20 can control whether power is supplied to the crypto coprocessor 22 by the external power input at power line 30 or a storage device, in this case capacitor C1. The transistor Q1 acts as a switch. In the preferred embodiment of the present invention, C1=0.04 F, R1=680Ω, R2=47Ω, and R3=10 KΩ. It will be understood that these are variable relative to each other for corresponding implementations.

Figure 3:
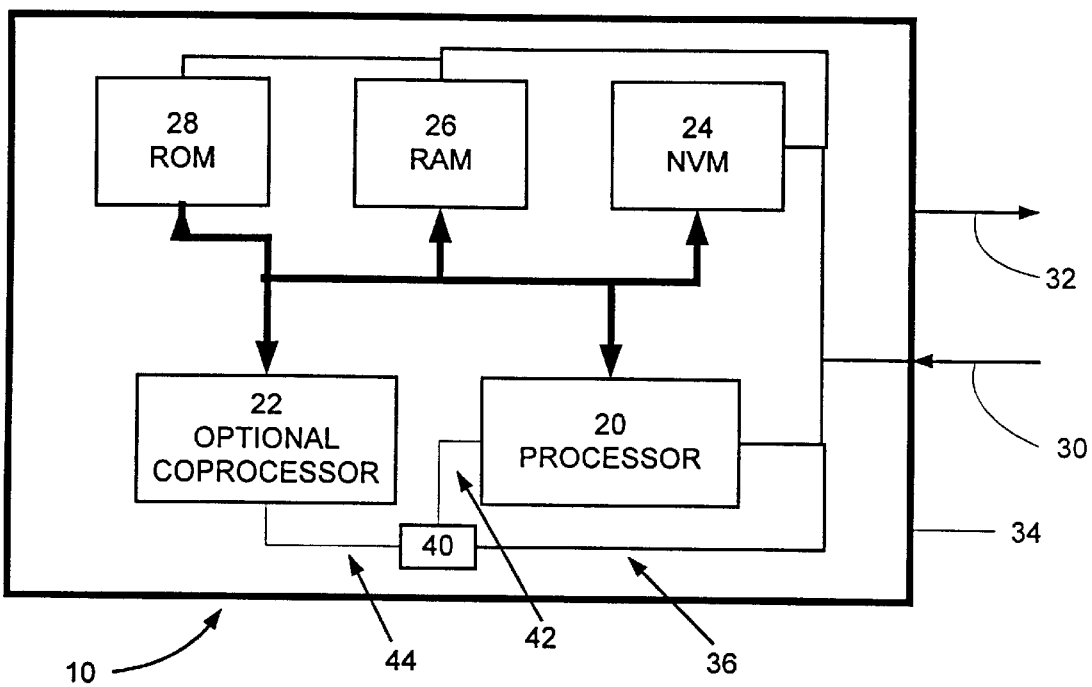
FIG. 3 is a block diagram of the storage circuit of FIG. 2 integrated into the device of FIG. 1 in accordance with the preferred embodiment of the present invention.

Referring to FIG. 3, the power storage circuit 40 is configured to provide power to coprocessor 22. When processor 20 determines that cryptographic operations are not being performed, the power control line, generally designated 42, is used to close the switch, i.e. transistor Q1, allowing capacitor C1 to accumulate charge. During cryptographic operations, processor 20 opens the switch, transistor Q1, and the charge stored in capacitor C1 is used to power cryptographic coprocessor 22 through crypto power line, generally designated 44. When the switch is open, no power fluctuations of cryptographic coprocessor 22 are conducted out the external power input line 30 and, therefore, DPA cannot be performed.

Figure 4:
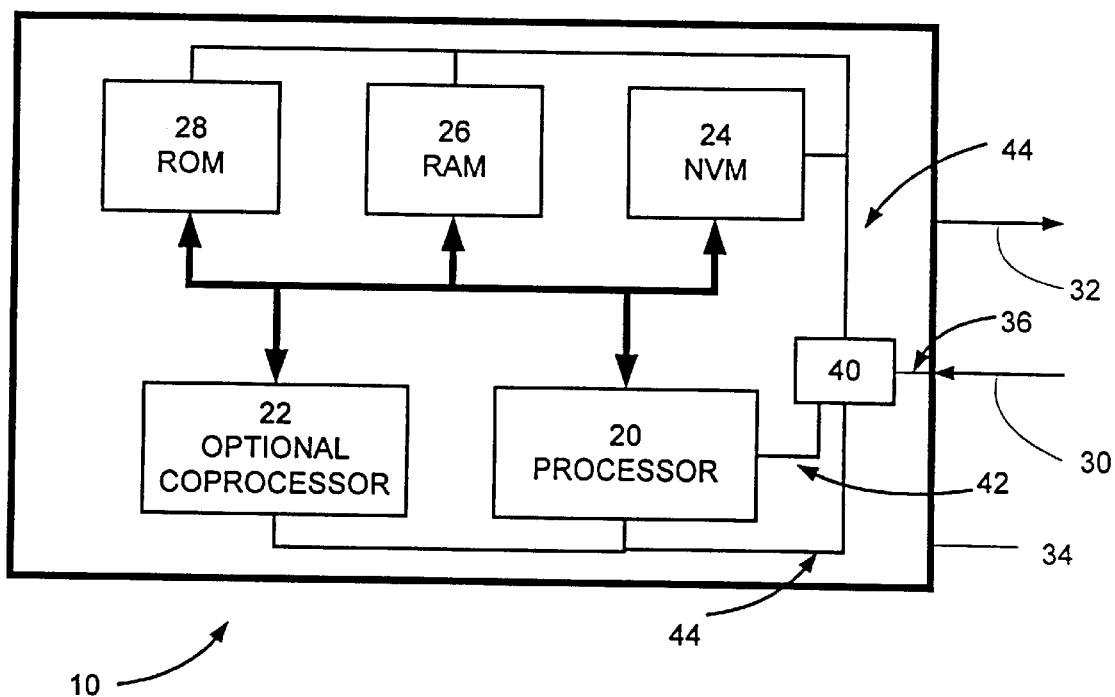
FIG. 4 is a block diagram of the storage circuit of FIG. 2 integrated into the device of FIG. 1 in accordance with an alternate embodiment of the present invention.

Referring now to FIG. 4, an alternate embodiment is shown wherein circuit 40 is configured to power the entire cryptographic device 10 and not just crypto coprocessor 22. This alternate embodiment is particularly suitable for preventing DPA when cryptographic coprocessor 22 is not present in cryptographic device 10 and processor 20 performs all cryptographic operations. This alternate embodiment is also suitable when coprocessor 22 shares its input power with processor 20, as shown in FIG. 1. However, it is noted that using this alternate embodiment to power the entire cryptographic device 10 requires a larger capacitor than is needed to power only coprocessor 22. It is further noted that capacitor C1 is only one form of energy storage device and could be replaced by another storage device, such as a battery or inductor and its charging circuit.

In some implementations, a storage device large enough to supply power for the entire cryptographic operation cannot be implemented. For example, when cryptographic device 10 is a single integrated circuit and power storage circuit 40 is part of the integrated circuit, a large enough capacitor C1 to supply power for the entire cryptographic operation may not be available. In such implementations, a smaller storage device can be used to supply power for part of the cryptographic operation. The cryptographic processing can be halted while the storage device recharges and resumed after the storage device has been sufficiently charged. Alternatively, processing can continue while the storage device recharges. However, in either case information concerning the cryptographic key used in the cryptographic operation will be conducted out the external power input line 30 although not to the same degree as without the circuit in place. If either of these techniques is used in conjunction with the proposed countermeasures discussed previously (the introduction of signal noise or filters on the power line, random timing and delays during cryptographic processing, and the introduction of extraneous operations) a high level of DPA resistance can be achieved.

Figure 5:
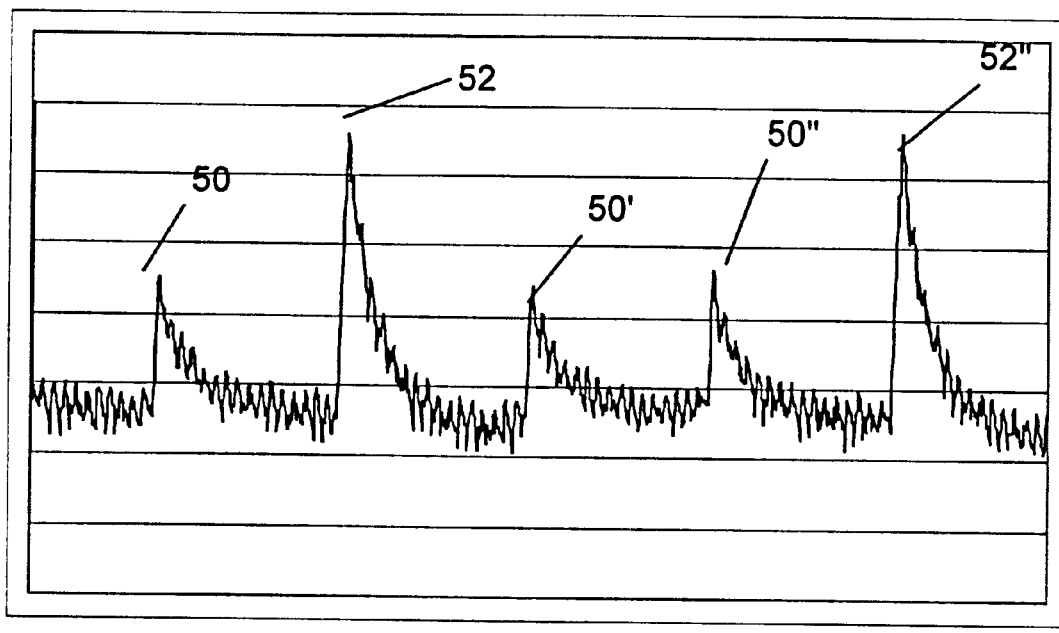
FIG. 5 is a graph which is representative of the current drawn by a portion of an RSA signature generation performed by the device of FIG. 1 prior to implementation of the present invention.

Referring now to FIG. 5, a graph is shown which is representative of the current drawn, as measured at line 30, by a portion of an RSA signature generation performed by cryptographic device 10 prior to implementation of the invention. The difference between squaring and multiply operations can be clearly seen. Multiply operations 52 require more power and therefore are represented by the higher peaks than squaring operations 50. The RSA key used can be easily derived from the graph of FIG. 5. A 1 is represented by a square followed by a multiply (50–52 and 50"–52"), while a zero is represented by simply a square (50').

Figure 6:
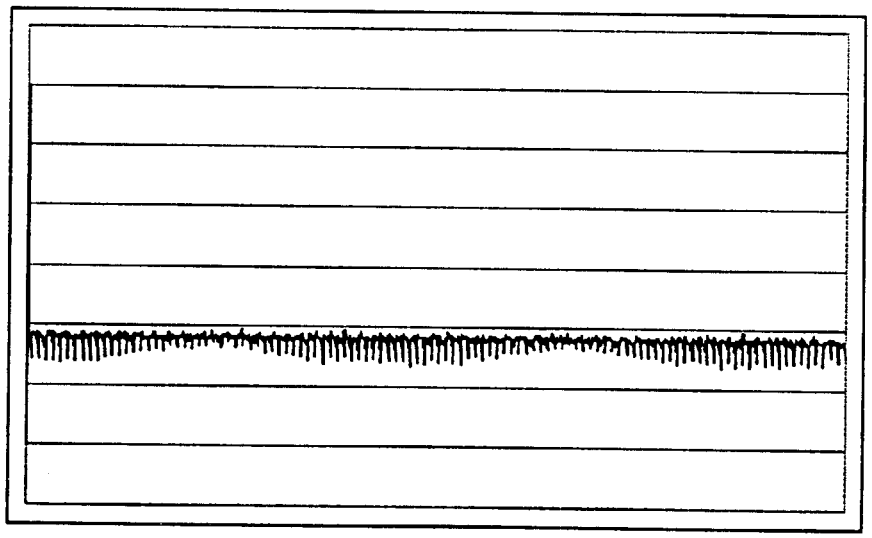
FIG. 6 a graph which is representative of the current drawn by a portion of an RSA signature generation performed by the device of FIG. 1 after implementation of the present invention.

Referring now to FIG. 6, a graph is shown which illustrates the effectiveness of the present invention. The same portion of the RSA signature generation as shown in FIG. 5 is depicted in FIG. 6 after the addition of power storage circuit 40 to cryptographic device 10. It is noted that the peaks representative of the square and multiply operations previously observable in FIG. 5 are no longer observable in FIG. 6.

While the present invention has been disclosed and described with reference to embodiments thereof, it will be apparent, as noted above, that variations and modifications may be made therein. It is, thus, intended in the following claims to cover each variation and modification that falls within the true spirit and scope of the present invention.

What is claimed is:

1. A method of limiting conducted emissions by a cryptographic device performing cryptographic operations, the method comprising the steps of:

enclosing the cryptographic device within a physically secure environment;

providing power to the cryptographic device from a first power source, said first power source being external to the physically secure environment;

locating a second power source within the physically secure environment; and providing power to a processor in the cryptographic device from the second power source at least when the processor is performing the cryptographic operations.

2. The method of claim 1 wherein the steps of providing power comprise the steps of:

switching from the first power source to the second power source when the processor is performing the cryptographic operations; and switching from the second power source to the first power source when the processor is not performing the cryptographic operations.

3. The method of claim 1 wherein the second power source is a power storage circuit, the power storage circuit storing power from the first power source when cryptographic operations are not being performed and providing power to the processor when cryptographic operations are being performed.

4. The method of claim 3 wherein the cryptographic operations are divided into a plurality of segments wherein the second power source is storing power from the first power source between the segments.

5. A method of limiting conducted emissions by a cryptographic device performing cryptographic operations, the method comprising the steps of:

enclosing the cryptographic device within a physically secure environment;

providing power to the cryptographic device from a first power source, said first power source being external to the physically secure environment;

locating a second power source within the physically secure environment; and providing power to the cryptographic device from the second power source at least when the cryptographic device is performing the cryptographic operations.

6. The method of claim 5 wherein the steps of providing power comprise the steps of:

switching from the first power source to the second power source when the cryptographic device is performing the cryptographic operations; and switching from the second power source to the first power source when the cryptographic device is not performing the cryptographic operations.

7. The method of claim 5 wherein the second power source is a power storage circuit, the power storage circuit storing power from the first power source when cryptographic operations are not being performed and providing power to the processor when cryptographic operations are being performed.

8. A cryptographic system for performing cryptographic operations, comprising:

at least one processor for performing cryptographic operations;

memory means coupled to the processor for use in performing the cryptographic operations;

storage means coupled to the processor for storing and retrieving information calculated and used in the cryptographic operations;

means for securely enclosing said processor, said memory means and said storage means whereby direct access to the cryptographic operations is prevented;

a first power source coupled to and supplying power to said processor, said memory means and said storage means, said first power source being external to said secure enclosing means;

a second power source coupled to and supplying power to at least said processor, said second power source being internal to said secure enclosing means; and means for switching from said first power source to said second power source when the cryptographic operations are being performed and for switching from said second power source to said first power source when non-cryptographic operations are being performed.

9. The system of claim 8 wherein the second power source is a battery.

10. The system of claim 8 wherein said second power source is a power storage circuit.

11. The system of claim 10 wherein said power storage circuit includes a capacitor, said capacitor being charged during the non-cryptographic operations and being discharged to supply power to at least the processor during the cryptographic operations.

12. The system of claim 8 wherein the cryptographic operations is divided into a plurality segments wherein the second power source is recharged between segments.

* * * * *